United States Patent [19]

Akiyama

[11] Patent Number: 5,940,846
[45] Date of Patent: Aug. 17, 1999

[54] ELECTRONIC MANUAL DISPLAYING METHOD FOR DISPLAYING A DATA SECTION CONTAINING A CHARACTER STRING FOUND IN AN ELECTRONIC DATA FILE

[75] Inventor: Hidetoshi Akiyama, Kawasaki, Japan

[73] Assignee: Fujitsu Limited, Kawasaki, Japan

[21] Appl. No.: 08/730,461

[22] Filed: Oct. 15, 1996

Related U.S. Application Data

[63] Continuation of application No. 08/299,263, Sep. 1, 1994, abandoned.

[30] Foreign Application Priority Data

Dec. 6, 1993 [JP] Japan .................................. 5-305258

[51] Int. Cl.$^6$ ........................................... G06F 17/21
[52] U.S. Cl. ............................................... 707/539
[58] Field of Search ........................... 707/539, 1, 104, 707/513, 514, 526

[56] References Cited

U.S. PATENT DOCUMENTS

| | | | |
|---|---|---|---|
| 4,972,349 | 11/1990 | Kleinberger | 707/1 |
| 4,992,972 | 2/1991 | Brooks et al. | 345/338 |
| 5,062,074 | 10/1991 | Kleinberger | 707/5 |
| 5,241,671 | 8/1993 | Reed et al. | 707/104 |
| 5,392,387 | 2/1995 | Fitzpatrick et al. | 345/350 |

FOREIGN PATENT DOCUMENTS

| | | |
|---|---|---|
| 1-194064 | 8/1989 | Japan . |
| 4-340660 | 11/1992 | Japan . |

OTHER PUBLICATIONS

Richy, "A hypertext electronic index based on the Grif structured document editor", Electronic Publishing, v. 7, n. 1, pp. 21–34, Mar. 1994.

Simpson, Mastering WordPerfect 5.1 & 5.2 for Window, pp. 433–439, Dec. 1993.

*Primary Examiner*—Anton Fetting
*Attorney, Agent, or Firm*—Staas & Halsey

[57] ABSTRACT

A method of displaying an electronic manual which minimizes the labor and time required for displaying a sentence containing a specific character string, particularly when the character string exists in more than one sentence in the electronic manual. Upon retrieval of an item present in plural areas, a sub-window is opened to list all the pages containing the item, partly displaying the contents of one of the listed pages. This allows the user to view and check the brief contents of the other pages prior to determining the page to be fully displayed. The page number can be designated at random and the description can be viewed as many times as required.

3 Claims, 6 Drawing Sheets

FIG. 1

```
<body><h1><title id="chaper 1"><vix sortkey="general
description of /plum2">GENERAL DESCRIPTION OF
TDS/PLUM2</vix><intro>
 <p><vix sortkey="tds/plum2" majref="major">TDS/PLUM2</vix>
is an abbreviation of Technical Documentation
System/Personal onLine User's Manual 2 and this system is
comprised of a manual which is electrically converted and
programs for referring to the contents thereof.
Electrically converted manuals is called an electronic
manual.</p>
 <p> This chapter will explain the following items as to
TDS/PLUM2.</p>
 <useql>
 <li><lkey>-<p> Outline of TDS/PLUM2
 <li><lkey>-<p> Resource Required for Introduction
 <li><lkey>-<p> Updating Electronic Manual
 </useql>
<h2><title id="section 1.1"><vix sortkey="outline of
tds/plum2">Outline of TDS/PLUM2</vix>
 <p>Role of TDS/PLUM2 in the user's task will be described
below.</p>
 <topic1><title><vix sortkey="role of tds/plum2 in the
user's task">Role of TDS/PLUM2 in the user's task</vix>
          :
```

XX MANUAL

INDEX LIST a a a
b b b
c c
d d

PAGE NUMBER: 10, 35, 101

"aaa" IS ....

FIG. 5 (A)

XX MANUAL

DESCRIPTION OF ITEM

When "bbb" is used, "aaa" is necessary.

PAGE NUMBER: 10, 35, 101

"aaa" IS ....

ELECTRONIC MANUAL DISPLAYING METHOD FOR DISPLAYING A DATA SECTION CONTAINING A CHARACTER STRING FOUND IN AN ELECTRONIC DATA FILE

This application is a continuation of application Ser. No. 08/299,263, filed Sep. 1, 1994, now abandoned.

BACKGROUND OF THE INVENTION

1. Field of the Invention

The present invention relates to an electronic manual displaying method and, more particularly, to a method of retrieving a specified word from an electronic manual comprising electronic document data and displaying the document in which the specified word is contained.

2. Description of the Related Art

Recently, owing to the advent of CD-ROM (Compact Disc Read Only Memory), large amounts of document data of a dictionary or a lexicon are converted to electronic data, stored in the CD-ROM, and commercially supplied. Because manuals and other massive documents in a paper version also require extensive space and expense for storage, there has been a need for them to be supplied in a form of electronic data files, i.e., electronic manuals. This contributes to a reduction in space requirements for storage and improves efficiency in transfer of the manuals, by converting the original document data to electronic data and storing the data in a CD-ROM.

On the other hand, a document description language, Standard Generalized Markup Language (SGML), in which a logical structure or semantic structure of the electronic documents is described with simple marks called tags, has been established by the International Standards Organization (ISO). Tagging is carried out by attaching predetermined marks to structurally or semantically important positions such as a title, chapter, item, etc. The SGML document may be used, for example, to prepare an index list by retrieving and extracting the tagged parts. Additionally, because of compliance with the international standard ISO 8879, document data described using SGML may be shared by plural processing devices of different models. In the field of electronic manuals, which are distributed in a mass storage medium such as a CD-ROM capable of storing a large quantity of data, there also is a movement to introduce such a document description language, which is particularly desirable for electronic manuals where retrieval and reference operations are often used.

Conventionally, when a user retrieves a character string of a particular term from document data of an electronic manual stored in a CD-ROM using a computer, in order to start a retrieval operation, he has to select a retrieval function through a keyboard or the like, determine the retrieving direction either forward or backward, then enter the character string to be retrieved, and finally designate execution of the retrieval. The character string is thereby searched for in the retrieval direction from the retrieval starting point, the page where the first detected string is located is displayed on a screen, and a cursor is moved to the position of the retrieved character string. After that, if the continuation of the retrieval operation is designated, another page where the subsequently detected string is located is displayed, and the cursor is moved to the position of the character string. Thus, the character string is retrieved in sequence in the retrieval direction from the retrieval starting point, and every time the retrieved character string is found, the page containing the character string is displayed and the cursor moves to the position of the character string.

However, it is a disadvantage of the conventional retrieval method that when the specified character string is located near the end of a manual, the user has to depress the key many times to continue the retrieval operation until the desired character string is displayed. Another disadvantage of the conventional method is that if the user realizes, during the retrieval operation, that the character string he wants has already been found and displayed but he has failed to stop there, he must begin the retrieval operation again to return to this character string.

SUMMARY OF THE INVENTION

It is an object of the present invention to provide an electronic manual displaying method which minimizes the labor and time required to display the desired sentences containing the character string to be retrieved when the character string is located in more than one place in the document of the electronic manual.

To achieve the above object, according to the present invention, there is provided an electronic manual displaying method wherein a designated character string is retrieved from an electronic data file to be displayed. This electronic manual displaying method comprises the steps of designating a character string to be retrieved, obtaining data surrounding the designated character string, displaying positions of the surrounding data of the designated character string on a screen, and displaying one piece of the surrounding data containing the character string across an entire screen when the surrounding data is selected and determined.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

An embodiment of the present invention will be outlined first.

Figure 1:
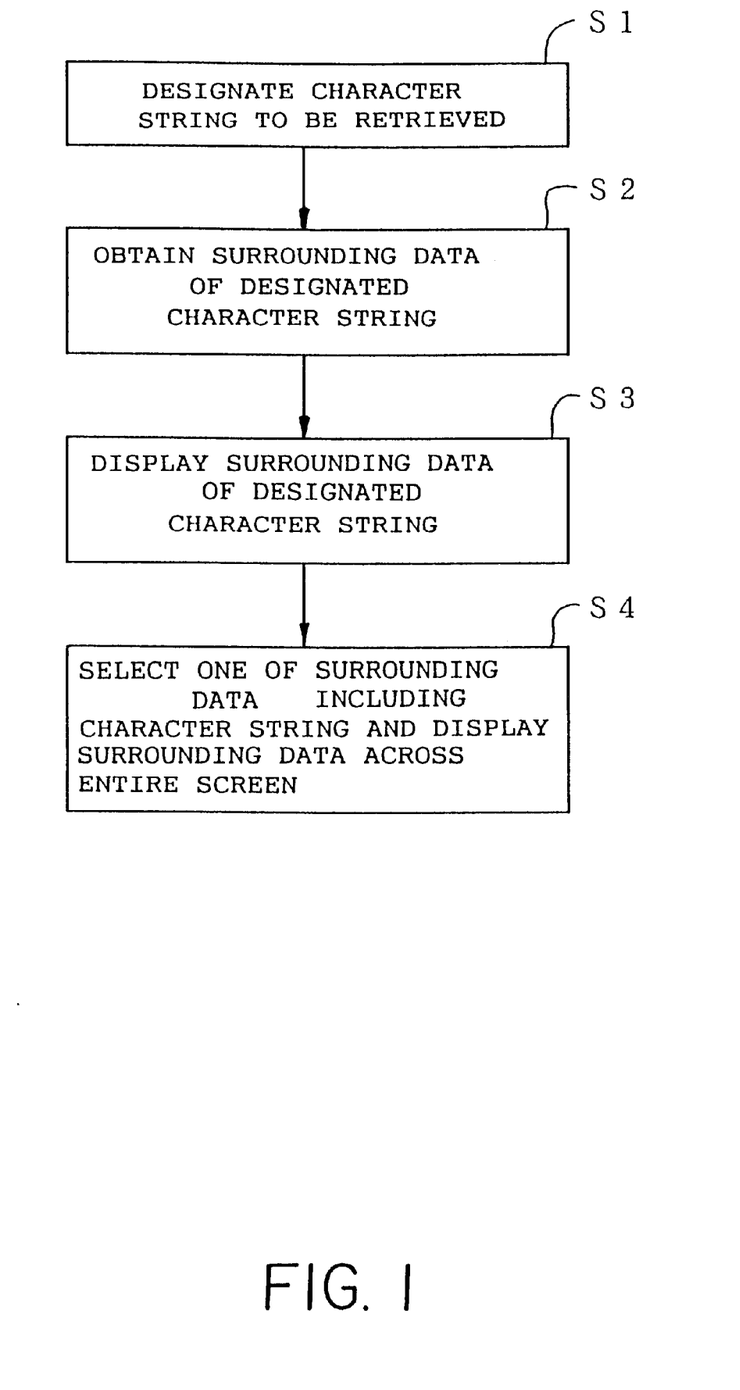
FIG. 1 is a block diagram illustrating the principle of the invention.

FIG. 1 is a block diagram illustrating the principle of the present invention to achieve the purpose mentioned above.

An electronic manual obtained by converting an original manual into electronic data is stored in a data file. To retrieve a character string from this electronic manual, first, in step S1, the character string to be retrieved is entered by typing the character string using a keyboard or designating the character string in the document displayed on the screen by means of a pointing device such as cursor keys on the keyboard, a mouse, or the like. In step S2, then, surrounding data, each of which contains the specified character string, are obtained. Then, in step S3, positions of the surrounding data are displayed on a screen which is currently displaying the electronic manual. Finally, in step 4, when any one of the surrounding data including the specified character is selected, the surrounding data is displayed across the entire screen.

According to the electronic manual displaying method of the present invention. When the retrieval operation is started based on the character string to be retrieved and which is entered in step 1, the surrounding data of each usage of the character string are obtained from an index file in step 2. In step 3, all the positions (pages) of the surrounding data are displayed, and at the same time, the data neighboring any one usage of the retrieved character string are displayed. Unless any one usage of the specified retrieved character string in those surrounding data is designated as a major index item, the surrounding data including the first usage of the detected character string in the electronic manual is selected for display. On the other hand, if any one usage of the specified retrieved character string is designated as a major index item, the surrounding data corresponding to that instance of the retrieved character string is preferentially selected for display. After that, the user can specify the surrounding data of any one usage of the retrieval character string from the positions (pages) thereof displayed on the screen, and whenever the user specifies other surrounding data, the screen display changes to the data neighboring the retrieved character string which is contained in the specified surrounding data. Then, in step 4, as the surrounding data to be referred to is determined, the selected surrounding data is displayed across the entire screen.

Next, the embodiment of the present invention will be described below in detail.

Figure 2:
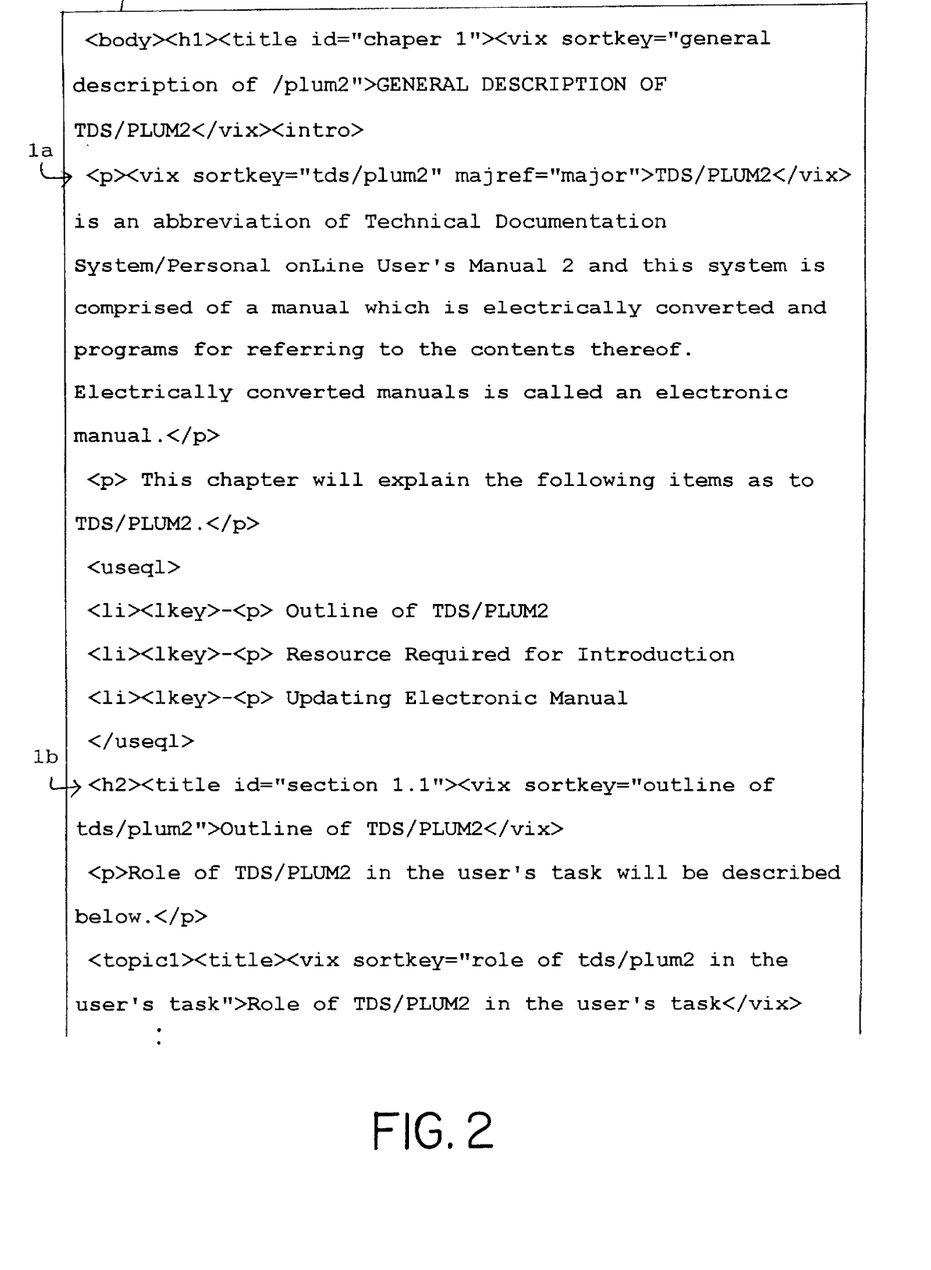
FIG. 2 is a view showing an electronic manual by way of example.

FIG. 2 shows an electronic manual by way of example, and more specifically, a part of an electronic manual 1 prepared in accordance with the SGML format. In the SGML-formatted document, as shown in FIG. 2, marks described with "<>" and "</>" are attached to the beginning and the end of a tag.

An original electronic manual 1 has the same construction as that of a paper manual comprising a table of contents, subsections and the like, although it is fully marked with tags. The tags allowed in this electronic manual 1 may comprise, for example, a cover, table of contents, body document, appendix, glossary, bibliography, index list, reference section (terms appearing in the body and listed in the index list), headings such as chapter, section, or item, figures, examples, shift count, etc.

In the electronic manual 1, a sentence 1a is given as an example in which a term to be used as an index item is designated as a major one. That is, this sentence 1a contains a term "TDS/PLUM2" to be used as an index item and the description thereof, such as a definition and the like, is deemed to be important for the term. When such a major index item is specified as a retrieval object, the description area including the major index item is referred to and displayed in preference. Another sentence 1b, in which the same term to be used as an index item is not designated as an major index item but an as ordinary item, is merely listed by a description area (page number) upon retrieval.

Figure 3:
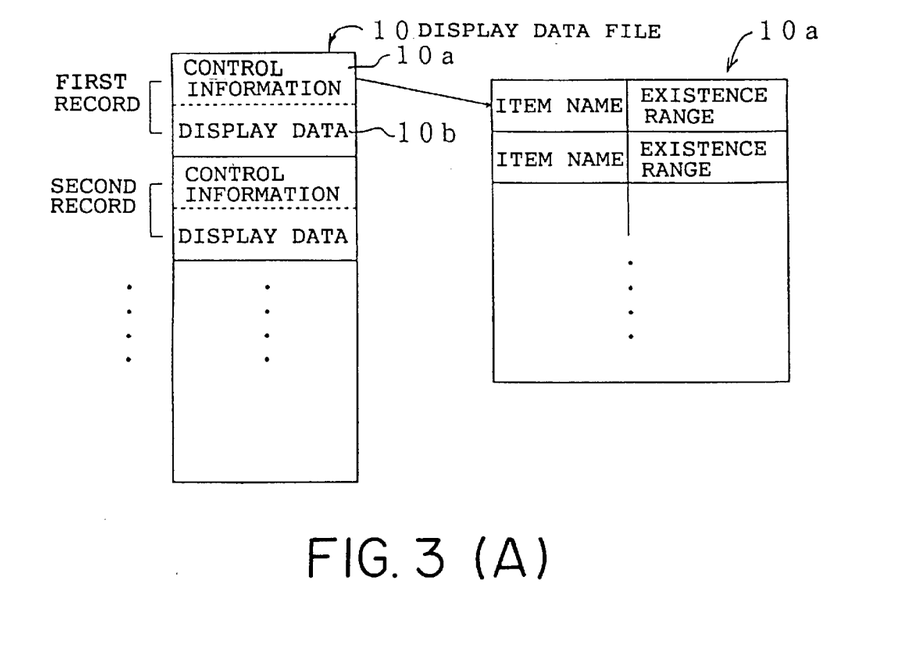
FIG. 3(A) is a view showing a data configuration of a data file of a processed electronic manual.
FIG. 3(B) is a view showing another example of a data configuration of an index file of a processed electronic manual by way of example.

FIGS. 3(A) and 3(B) show a data configuration of a processed electronic manual by way of example. FIG. 3(A) shows a display data file 10 which is processed from the electronic manual 1 shown in FIG. 2 according to tag information written therein, and FIG. 3(B) indicates an index file 20 which is processed similarly.

The display data file 10 includes records, each of which is provided for each page of the electronic manual 1 and comprises a pair of control information 10a and display data 10b, and the records are prepared for all the pages. The display data 10b contains the data for displaying the body document for one page of the electronic manual 1 on a screen. On the other hand, in the control information 10a, terms to be used as index items in the page and the existence range thereof are recorded. For example, if a term "TDS/PLUM2" is located in the display data 10b, the term "TDS/PLUM2" and a display data offset value thereof are recorded in the control information 10a as an item name and the existence range thereof, respectively. The existence range indicates a range from which byte to which byte of the display data to be displayed which includes the item name. On the screen display, in accordance with the control information 10a and the display data 10b, the item name recorded as the control information 10a is highlighted, inverted, or displayed in a different color to identify the item name as a term listed in an index, and thereby distinguishing from the other body text.

An index file 20, in which an index list of the electronic manual 1 is recorded, comprises an item name and the information indicative of where the item is located in the electronic manual 1. That is, each entry of the index file 20 comprises an item name 20a, an existence record 20b and an in-record sequence number 20c. The existence record 20b indicates which record (or page) of the electronic manual 1 holds the item, and the in-record sequence number 20c (or display data offset) shows the location of the item in the record when a plurality of instances of the item exists in the record. In addition, if the item extends over plural records, then the existence record 20b and the in-record sequence number 20c are combined and recorded for the number of existing records. For retrieving the item in the electronic manual 1, an intended item name 20a is searched from this index file 20 and all the description areas of the item are obtained from the existence record 20b of the item name 20a.

Figure 4:
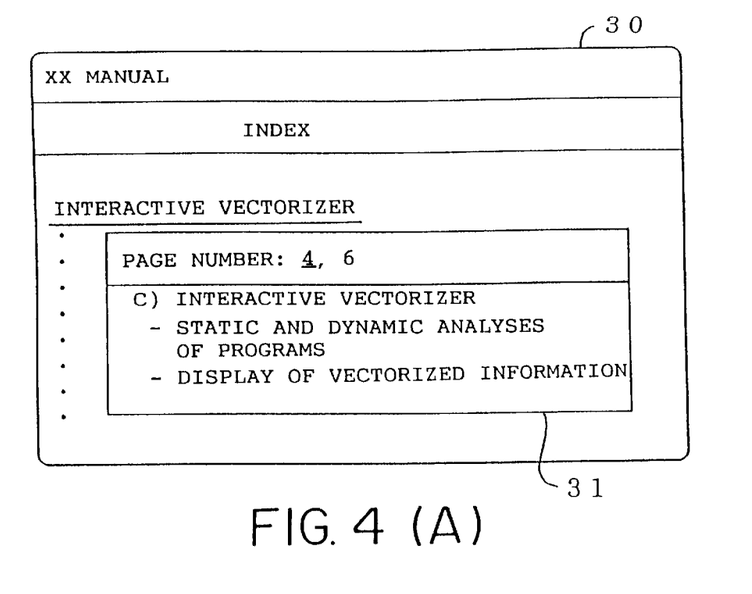
FIG. 4(A) is a view showing a screen display having a sub-window indicating each page of the processed electronic manual in which a selected item is used.
FIG. 4(B) is a view showing a screen display of a selected item and a data section containing the selected item.

FIGS. 4(A) and 4(B) show display screens respectively of the present invention. Specifically, an example of a screen 30 is shown where more than one description area for the item "interactive vectorizer", which is listed in the index list, are located when a retrieval operation is carried out with reference to the item. FIG. 4(A) shows the screen when a result of the retrieval operation is displayed in a sub-window, and FIG. 4(B) shows the screen when the intended page of the user is determined.

To refer to the page where the item "interactive vectorizer" is described, the retrieval operation for the item is executed. Then the index file 20 is referred to and the entire area where the item is described is obtained. If plural areas are obtained, a sub-window 31 opens in the currently referred screen, the numbers of the pages of the description areas are listed in the upper area of the sub-window 31, and the several lines of the text including the character string "interactive vectorizer" is displayed.

From the display example shown in FIG. 4(A), it is recognized that the character string "interactive vectorizer" is described in the 4th and 6th pages and neither instance of the character string is designated as a major index item, but as an ordinary index item. Accordingly, the number "4" which represents the lowest page number is inverted or colored (underlined in this figure) for emphasis in the upper area of the sub-window 31, and the sentence in the 4th page which contains the word string "interactive vectorizer" is displayed for several lines in the lower area of the sub-window.

To see the contents of the 6th page, the user only has to select "6" by indicating it with cursor keys "" or "" on the key board or a cursor controlled by a pointing device such as a mouse, track ball, thumb ball, etc. Then the display in the lower area of the sub-window 31 is changed to the sentence containing the character string "interactive vectorizer" in the 6th page. Thus, by selecting one of the page numbers listed in the upper area of the sub-window 31, the user can display a part of the page in turn. Especially in the page selection using a mouse, as a page number may be designated at random, the user can select an arbitrary page number regardless of the order in which the page numbers are arranged.

Finally, by pressing an execution key with a page being selected (the 4th page is selected in this example), the page is determined as a page to be referred to, and thereby, the sub-window 31 disappears from the screen and the description area of the determined page is displayed across the entire screen.

Figure 5:
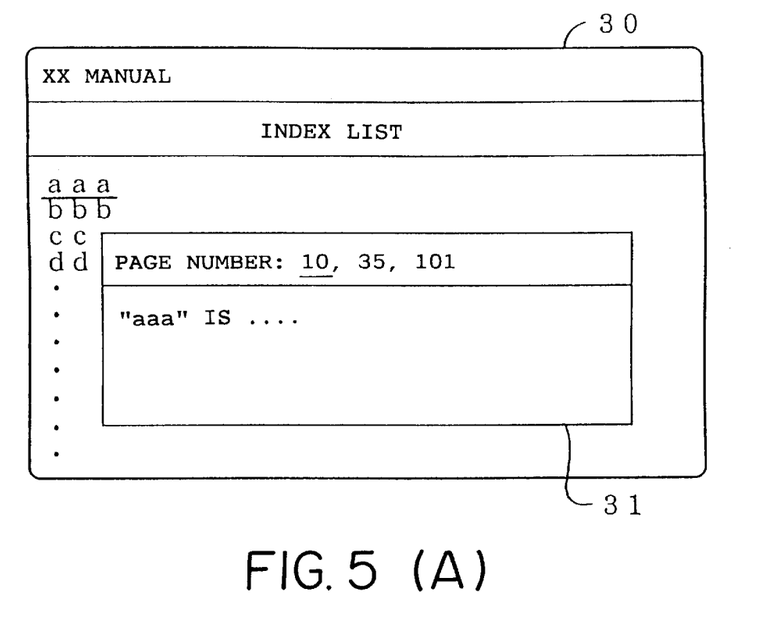
FIG. 5(A) is a view illustrating a method for selecting an item to be retrieved from an index list in accordance with the present invention.
FIG. 5(B) is a view illustrating a method for selecting an item to be retrieved from a sentence in the processed electronic manual in accordance with the present invention.

FIGS. 5(A) and 5(B) illustrate a method for selecting an item to be retrieved. For retrieving an item described in the electronic manual 1, there are three ways for retrieving the item: (1) by directly entering the character string of the item name through a keyboard; (2) by selecting the item from an index list shown in FIG. 5(A); and (3) by selecting the item from a sentence containing the item as shown in FIG. 5(B).

The item to be retrieved is selected by indicating the item in the index list on the screen by pressing the cursor keys or moving a mouse cursor. If the item appears in the electronic manual 1 more than once, then the sub-window 31 opens in which the list of positions of the description area (page number) of the item to be retrieved and the contents of one of the descriptive areas are displayed. Referring to the example shown in FIG. 5(A), when the item "aaa" is selected from the index list, the description areas of the item are located in three pages "10", "35", and "101", respectively, and the contents described in the page "10" are displayed. In this example, the sub-window 31 shows the contents from the page "10" whose page number is the lowest of all. This means that the index items may all be designated as the normal items, or that the index item in the description area of the page "10" is, by chance, designated as a major index item where the index item is defined.

When selecting an item from another descriptive sentence, if there is a character string that exists as an index item in a sentence of an item description area, the character string is highlighted, so that the item is selected by indicating the highlighted position by pointing to the item as an index item using a cursor key or a mouse cursor. Display of the sub-window 31 after the selection of an index item is the same as the display after the item is selected from the index list.

Figure 6:
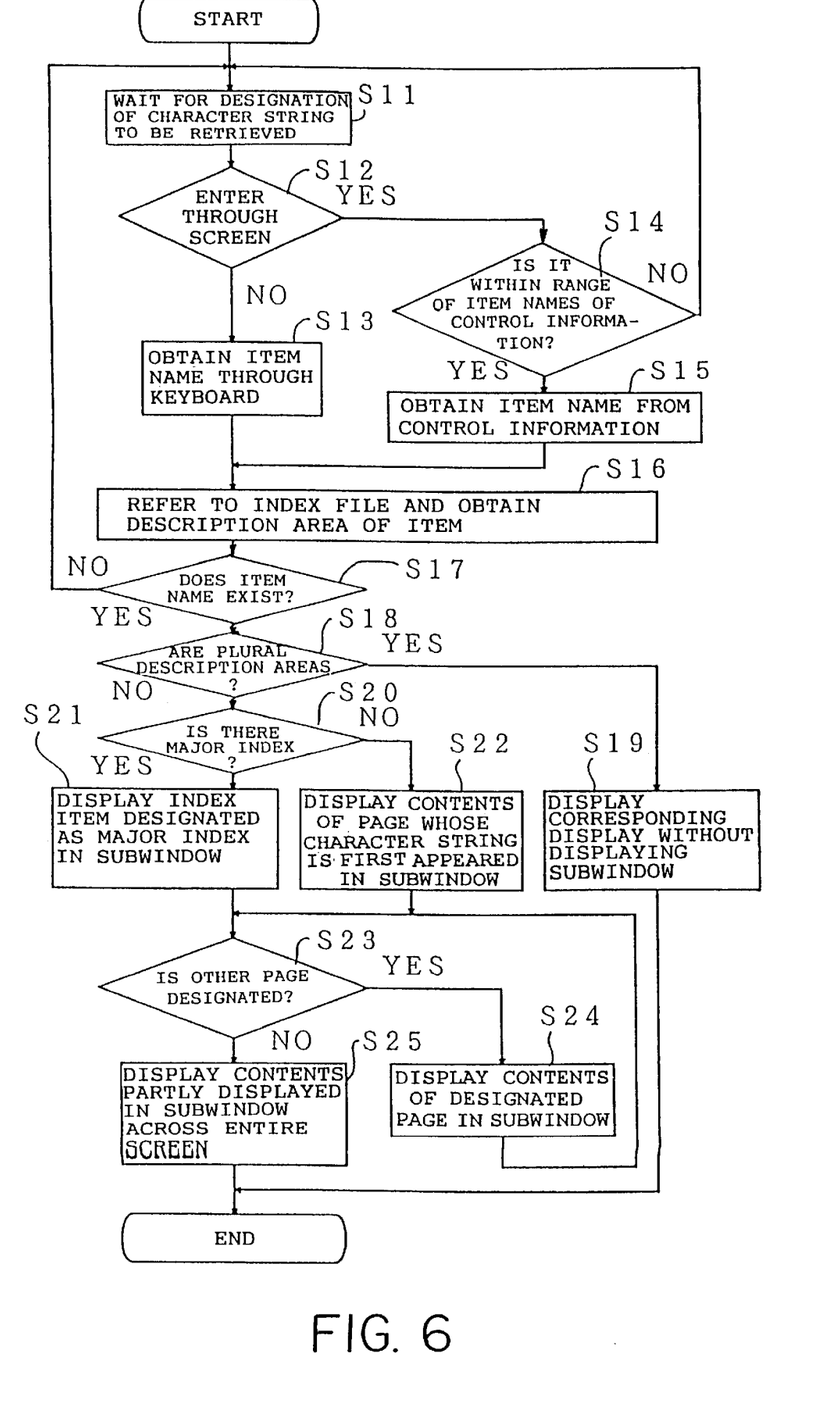
FIG. 6 is a flow chart used to explain the processing of an electric manual displaying method in accordance with the present invention.

FIG. 6 is a flow chart illustrating the processing of an electric manual displaying method of the present invention.

In FIG. 6, for retrieving an index item in the electronic manual 1, a computer waits for a designation of a character string to be retrieved in Step S11. The way for the designation to be made is either entering the string using a keyboard or designating an index item on a screen. Step S12 determines which way is used. When the character string is entered through the keyboard, the item name is obtained through the keyboard in Step 13. When the character string is selected from the highlighted items on the screen, the item name is entered, for example, by clicking a mouse button after positioning the cursor on the objective item name. When the character string is obtained from the item names displayed on the screen, the item is checked for whether it is located in the item name list in control information 10a in a display data file 10 in Step S14, and if not located, flow returns to Step S11. If located, the item name is obtained from the existence range in Step S15.

Then, in Step S16, the index file 20 is retrieved with the item name which as been previously obtained and it is checked whether the item name is located in the index file 20 in Step S17. The reason for such checking is that when the item name is inputted through a keyboard, the item name may not be found because of input error or the like. If the item name is found in the index file 20, then it is determined whether the item name exists in plural description areas in Step S18. If the item name exists only in a single area, there is no need to selectively display the data in the sub-window, so that the data of the corresponding page is directly displayed across the entire screen in Step 19.

If the item name exists in plural description areas, it is checked whether any major index item is contained therein in Step 20. If the major index is contained in the description area, the index item in the area designated as a major index item is displayed preferentially in the sub-window in Step 21. That is, in the listed page number, the page number containing the major index item is highlighted and the sentence including the item in the page is displayed. If there is no major index item, the contents of the lowest number page, that is, the contents of the page whose item name is detected first, is displayed in the sub-window in Step S22.

If it is desired to refer to the contents of another page than that of the page currently displayed in Step S23, then the contents of the designated page can be displayed in turn in the sub-window by sequentially passing plural page numbers displayed in the sub-window with a cursor key until the designated page is reached, or directly indicating one of the displayed plural page numbers using the mouse cursor in Step S24. The page numbers may be displayed sequentially or at random at the top area of the sub-window. Thereby, the description area displayed in the sub-window can be instantly changed to refer to a part of the body document containing the item. If the user desires to see the contents of a particular page based upon viewing the contents partly displayed in the sub-window, by selecting the page with an execution key, for example, the sub-window is closed and the contents partly displayed in the sub-window currently are displayed across the entire screen in Step S25.

As mentioned above, according to the present invention, when a retrieval operation on an item contained in an electronic manual is executed and the item is described in plural areas, a sub-window is opened to list all the positions of the description areas. That is, the numbers of the pages are listed, and the sub-window partly displays the contents of any one of the listed pages. If necessary, the contents of any other listed page may be partly displayed in the sub-window prior to a determination of a page to be referred to. Therefore, even if there are plural description areas related to an objective item, it is not necessary to repeat or begin the retrieval operation again. If the contents first displayed in a sub-window are not the desired description area, the user may view the contents of another description area easily only by selecting another page number. In addition, the user can change the number of pages easily and view the description areas repeatedly as required, so that the desired page is easily and rapidly selected.

In addition, as the next desired description area is displayed in the sub-window which opens on the screen display, the contents of the source page partly remains on the screen, so that a portion of the contents of the source page and a portion of the contents of the designated description page can be viewed at once, thereby making the determination of the area to be referred to easier.

The foregoing is considered only as illustrative of the principles of the present invention. Further since numerous modifications and changes will be readily apparent to those skilled in the art, it is not desired to limit the present invention to the exact construction and applications shown and described, and accordingly, all suitable modifications and equivalents may be regarded as falling within the scope of the present invention in the appended claims and their equivalents.

What is claimed is:

1. An electronic manual displaying method wherein a designated character string is retrieved from an electronic data file in a processing apparatus, the manual displaying method comprising the steps of:

(a) designating the character string to be retrieved;

(b) searching an index file holding names and locations of items to be searched for a match of said designated character string with one of said items, to obtain respective surrounding sections of data containing each usage of said designated character string and respective page numbers in said electronic data file;

(c) opening a sub-window having a first box and a second box on a screen connected to the processing apparatus;

(d) displaying a listing of the page numbers containing each usage of said designated character string in the first box of the sub-window and automatically displaying one surrounding data section located on the page that is listed first in the listing;

(e) designating one of the page numbers listed in the first box of the sub-window, emphasizing the designated page number displayed in the first box, and displaying the surrounding data section located on the designated page in the second box of the sub-window;

(f) closing the sub-window upon confirmation of finally selecting the page number that is currently emphasized in the first box of the sub-window; and (g) displaying said surrounding data section finally selected, across the entire screen.

2. The electronic data manual as claimed in claim 1, wherein:

step (a) comprises
      displaying a source page of said electronic data manual on the entire screen, and
      moving an indicator to said character string to be designated and designating said character string; and
      steps (d) and (e) further comprise displaying the sub-window over a portion of the source page.

3. An electronic manual displaying method retrieving a character string from an electronic data file in a processing apparatus, comprising:

designating the character string to be retrieved;

searching a file holding identifiers and locations of items to be searched for a match of the designated character string with one of the items, to obtain respective surrounding sections of data containing each usage of the designated character string and respective page numbers in the electronic data file;

opening a sub-window having a first box and a second box on a screen connected to the processing apparatus;

displaying a listing of the page numbers containing each usage of the designated character string in the first box of the sub-window and automatically displaying one surrounding data section located on the page that is listed first in the listing;

designating one of the page numbers listed in the first box of the sub-window, emphasizing the designated page number displayed in the first box, and displaying the surrounding data section located on the designated page in the second box of the sub-window;

closing the sub-window upon confirmation of selecting the page number that is currently emphasized in the first box of the sub-window; and displaying the surrounding data section selected across the entire screen.

* * * * *